(12) United States Patent
Song et al.

(10) Patent No.: US 8,974,700 B2
(45) Date of Patent: Mar. 10, 2015

(54) METHOD AND SYSTEM FOR PRODUCING SYNTHESIS GAS

(71) Applicant: Wuhan Kaidi Engineering Technology Research Institute Co., Ltd., Wuhan (CN)

(72) Inventors: Kan Song, Wuhan (CN); Zhenhua Yao, Wuhan (CN); Qin Sun, Wuhan (CN); Shirong Zhang, Wuhan (CN); Haiqing Zhang, Wuhan (CN); Jinqiao Zhang, Wuhan (CN)

(73) Assignee: Wuhan Kaidi Engineering Technology Research Institute Co., Ltd., Wuhan (CN)

( * ) Notice: Subject to any disclaimer, the term of this patent is extended or adjusted under 35 U.S.C. 154(b) by 0 days.

(21) Appl. No.: 13/625,010

(22) Filed: Sep. 24, 2012

(65) Prior Publication Data

US 2013/0026419 A1    Jan. 31, 2013

Related U.S. Application Data

(63) Continuation-in-part of application No. PCT/CN2011/072063, filed on Mar. 23, 2011.

(30) Foreign Application Priority Data

Mar. 23, 2010 (CN) .......................... 2010 1 0132485

(51) Int. Cl.
*C01B 3/02* (2006.01)
*B01J 19/00* (2006.01)
(Continued)

(52) U.S. Cl.
CPC ............... *C10B 53/02* (2013.01); *C10B 49/02* (2013.01); *C10J 3/62* (2013.01); *C10L 9/083* (2013.01);
(Continued)

(58) Field of Classification Search
None
See application file for complete search history.

(56) References Cited

U.S. PATENT DOCUMENTS

| 6,178,899 B1 * | 1/2001 | Kaneko et al. ................. 110/346 |
| 2009/0071616 A1 * | 3/2009 | Suyama et al. ................. 162/23 |

(Continued)

FOREIGN PATENT DOCUMENTS

| CN | 1931959 | * 3/2007 | .............. C10B 53/02 |
| WO | WO 2010/060249 | * 3/2010 | .............. C10B 53/02 |

OTHER PUBLICATIONS

Machine Translation of CN1931959.*

*Primary Examiner* — Melvin C Mayes
*Assistant Examiner* — Douglas Call
(74) *Attorney, Agent, or Firm* — Matthias Scholl P.C.; Matthias Scholl

(57) ABSTRACT

A method for producing synthesis gas, including: 1) pretreating a biomass raw material; 2) carrying out low-temperature carbonization to obtain pyrolysis gas and charcoal, cooling the charcoal at an outlet of an carbonization furnace, and conveying the cooled charcoal to a charcoal storage bin; 3) separating the pyrolysis gas from charcoal powder; 4) delivering part of a separated pyrolysis gas to a combustion bed for combustion, heating the other part of the separated pyrolysis gas, and delivering a heated pyrolysis gas to the carbonization furnace; delivering a waste hot flue gas after heat exchange to a pretreatment part for the biomass raw material for drying; conveying the separated charcoal powder to the charcoal storage bin; 5) milling the charcoal powder to prepare a charcoal slurry; and 6) using high-pressure charcoal slurry pump, introducing the charcoal slurry to a gasification furnace for gasification.

20 Claims, 1 Drawing Sheet

(51) Int. Cl.
*C10B 53/02* (2006.01)
*C10B 49/02* (2006.01)
*C10J 3/62* (2006.01)
*C10L 9/08* (2006.01)
*C10J 3/46* (2006.01)

(52) U.S. Cl.
CPC .. *C10J 2300/0906* (2013.01); *C10J 2300/0916* (2013.01); *C10J 2300/094* (2013.01); *Y02E 50/14* (2013.01); *C10J 3/466* (2013.01); *C10J 2300/0903* (2013.01); *C10J 2300/0959* (2013.01); *C10J 2300/0973* (2013.01); *Y02E 50/10* (2013.01); *Y02E 50/15* (2013.01); *Y02E 50/30* (2013.01)
USPC ............................................ 252/373; 422/187

(56) References Cited

U.S. PATENT DOCUMENTS

| | | | |
|---|---|---|---|
| 2009/0107046 A1* | 4/2009 | Leininger et al. | 48/86 R |
| 2010/0105970 A1* | 4/2010 | Yanik et al. | 585/240 |
| 2010/0223846 A1* | 9/2010 | Yang et al. | 48/61 |

* cited by examiner

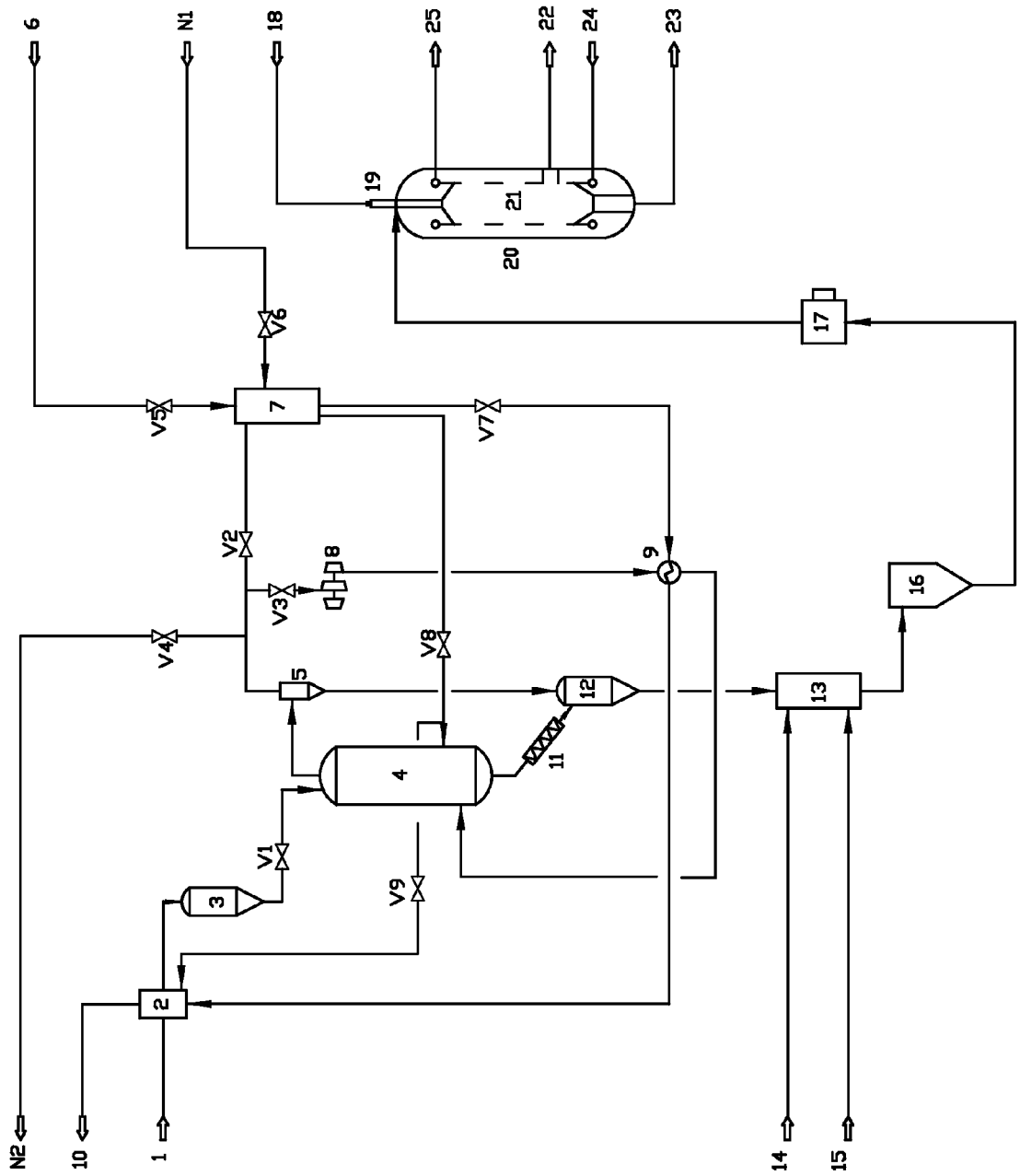

US 8,974,700 B2

METHOD AND SYSTEM FOR PRODUCING SYNTHESIS GAS

CROSS-REFERENCE TO RELATED APPLICATIONS

This application is a continuation-in-part of International Patent Application No. PCT/CN2011/072063 with an international filing date of Mar. 23, 2011, designating the United States, now pending, and further claims priority benefits to Chinese Patent Application No. 201010132485.1 filed Mar. 23, 2010. The contents of all of the aforementioned applications, including any intervening amendments thereto, are incorporated herein by reference. Inquiries from the public to applicants or assignees concerning this document or the related applications should be directed to: Matthias Scholl P. C., Attn.: Dr. Matthias Scholl Esq., 14781 Memorial Drive, Suite 1319, Houston, Tex. 77079.

BACKGROUND OF THE INVENTION

1. Field of the Invention

The invention relates to the production of synthetic gas, and more particularly to a method and a system for producing synthetic gas from biomass by carbonization. The method belongs to the technical field of producing synthetic gas or combustible gas by using biomass. The synthetic gas is a mixture gas which contains CO, $H_2$, and a variety of carbohydrates that contain carbon, hydrogen, and oxygen. The synthetic gas produced by the method according to the invention can be used for gas turbine power generation systems, fuel cells, synthetic oil, metallurgical and other systems.

2. Description of the Related Art

As dwindling of traditional fossil fuels (coal, oil, and natural gas) reserves and the environmental pollution problems caused by the use of fossil fuels directly threaten human survival and development, attaching importance to development of renewable and environmental friendly energy has become a consensus of governments of all countries. Biomass, an organic matter generated by plants through photosynthesis, has wide sources and large available quantity. It can be transformed into clean gas or liquid fuel for power generation and producing industrial raw materials and chemical products. As energy it is clean and renewable with zero emission of carbon dioxide and with the potential to fully replace fossil fuels as a new energy resource which has become a priority for all countries.

There are many methods for transforming biomass into clean gas or liquid fuel, among which biomass gasification technology can adapt to a variety of species and has good expansibility. The gasification of biomass is a thermochemical process, i.e., biomass reacts with a gasification agent (such as air, oxygen, vapor, carbon dioxide, etc.) under high temperature to produce a mixed gas consisting of carbohydrate containing carbon, hydrogen, and oxygen. The mixed gas is named synthetic gas. The components of the synthetic gas are decided by the species of used biomass, the type of the gasification agent, the reaction conditions, and the structure of a gasifier used therein. The objectives of gasification is, on the one hand, to minimize the consumption of materials and the gasification agent, as well as the tar content in the synthesis gas, and on the other hand, to maximize the gasification efficiency and the efficiency of carbon conversion, as well as the active ingredient (CO and $H_2$) content in the synthesis gas. The objectives are decided by the type of the used gasifier, the type of the gasification agent, the particle size of the biomass, the gasification pressure and temperature, and moisture and ash of the biomass, etc.

The gasification furnace used in the gasification process can be divided into three classes: fixed bed, fluidized bed, and entrained flow bed. The fixed bed has a simple gasification structure, convenience operation, flexible operation mode, a higher rate of carbon conversion, a wide range of running load which can be between 20% and 110%, and the solid fuel stays in the bed for a long period of time. However, the temperature is nonuniform and it has less efficiency of heat exchange, low heating value of the synthesis gas at the outlet, and the synthesis gas contains a large amount of tar. The fluidized bed is convenient for material addition and ash release, and the temperature is uniform and easy for adjustment. However, it is sensitive to the characteristics of raw materials. If the adhesion, thermal stability, moisture content, or ash melting point of raw materials changes, the operation will become abnormal. Furthermore, in order to ensure normal fluidization of the gasification furnace, it needs to keep lower temperature, and the synthetic gas has a large amount of tar. Since a large amount of tar is produced in the fixed bed and the fluidized bed, a tar cracking unit and purification equipment must be installed, which results in a complicated process. The entrained flow bed has a high and uniform operating temperature, good amplification characteristics, and particularly suitable for large-scale industrialization. Tar is cracked completely. However, the entrained flow bed has a strict requirement on particle size of raw materials. Based on current grinding technology, there is no way to grind biomass having much cellulose to a size suitable for the entrained flow bed. So the entrained flow bed cannot be used for gasification of biomass. Nowadays, tar cracking and pretreatment of biomass prior to gasification are tough problems for the development of biomass gasification.

A typical method for gasifying low tar biomass is summarized below. The method includes pyrolysis and gasification independently, and biomass is transformed into synthetic gas containing low content of tar. In the method, pyrolysis gas and charcoal experience incomplete combustion in the gasifier, and tar is cracked under high temperature. Although the tar content is decreased greatly, a lot of charcoal is consumed, resulting in a low content of CO produced in the subsequent reduction reaction and a high content of $CO_2$ in the synthetic gas. Secondly, due to a low temperature in the combustion reaction, the temperature at the subsequent reduction becomes lower, and the average temperature in the reduction zone is less than 700° C., and thereby the yield of effective synthetic gas (CO and $H_2$) is decreased significantly (about 30%). Thirdly, the ash and unreacted carbon residue from the reduction reaction is directly discharged, resulting in a low carbon conversion rate. Finally, the gasifier used in the method is in the form of a fixed bed, since the reduction reaction absorbs heat, the temperature difference between the top and the bottom (the top is about 1000° C. and the bottom is about 500° C.) of the bed is huge, which is an inherent disadvantage of fixed bed.

A typical method for producing synthetic gas with carbon-containing materials is described below. The method includes carbonization (or pyrolysis) and gasification independently. In the method, the carbonization temperature is controlled less than 450° F. so as to reduce the tar content resulted from pyrolysis. However, during carbonization stage, solid products are not ground prior to transporting to the reaction coils of the gasifier, which will affect the speed and degree of gasification reaction. Secondly, since the gasification reaction happens in the reaction coil, a large amount of transport gas is needed, but the transport gas will take away a lot of heat during transporting, and thereby the gasification efficiency is low, the temperature is nonuniform, and the subsequent waste heat recovery system is massive. Thirdly, it is not economic that newly-produced synthetic gas is used to provide heat for gasification and carbonization. Fourthly, combustion products (mainly $CO_2$ and $H_2O$) are directly discharged and not fully utilized, resulting in low gasification efficiency. Finally, the ash and unreacted carbon residue in the synthetic gas are also discharged directly, resulting in low carbon conversion rate.

Another typical method for producing synthetic gas from biomass by high temperature gasification is as follows. The method also adopts combination of carbonization and high temperature gasification. However, the method has following problems: firstly, heat of the carbonization furnace is supplied by direct combustion of external combustible gas and oxygen; the introduced high-quality external fuel gas greatly increases the energy consumption of the system; secondly, the adopted pyrolysis gas powder feeding system is complicated; when the high temperature pyrolysis gas is mixed with the low temperature carbon powder and fed into the gasification furnace, the mixture can easily be condensed to form tar, causing blockage and influencing the normal operation; finally, the high pressure charcoal produced in the carbonization furnace is fed into the normal pressure milling machine after being decompressed and cooled, so as to be made into powder, and then the carbon powder is pressurized and fed into the gasification furnace by the pyrolysis gas. The whole process is complicated and high in energy consumption so that the feasibility of the project is bad.

From the above mentioned methods, conventional gasification, whether from biomass or from solid carbon-containing materials, cannot produce synthetic gas with high efficiency and low cost. Although the technology of independent pyrolysis and gasification can adapt to a variety of biomass and reduce the content of tar in synthetic gas, shortcomings such as nonuniform temperature, large investment in equipment for waste heat recovery, high material consumption, low gasification efficiency, and low carbon conversion rate limit the application of biomass gasification in industry. Particularly, there is no effective method for gasifying biomass applied to an entrained flow bed.

SUMMARY OF THE INVENTION

In view of the above-described problems, it is one objective of the invention to provide a method and a system for producing synthetic gas from biomass by carbonization that have high efficiency and low cost.

To achieve the above objective, in accordance with one embodiment of the invention, there is provided a method for producing synthesis gas, the method comprising:
1) pre-treating a biomass raw material;
2) carrying out low-temperature carbonization to obtain products of a pyrolysis gas and a charcoal, cooling the charcoal at an outlet of an carbonization furnace to a temperature of 60-280° C., and conveying the cooled charcoal to a charcoal storage bin;
3) separating the pyrolysis gas from a charcoal powder after allowing a gas output from an upper part of the carbonization furnace to pass through a gas-solid separator;
4) delivering part of a separated pyrolysis gas to a combustion bed for combustion, heating the other part of the separated pyrolysis gas with a hot flue gas generated during the combustion of the combustion bed, and then delivering a heated pyrolysis gas to the carbonization furnace as a heat source for the carbonization furnace; delivering a waste hot flue gas after heat exchange to a pretreatment part for the biomass raw material for drying; conveying the separated charcoal powder to the charcoal storage bin;
5) milling the charcoal powder to prepare a charcoal slurry; and
6) introducing the charcoal slurry to a gasification furnace for gasification through a high-pressure charcoal slurry pump.

In a class of this embodiment, the low-temperature carbonization is a slow pyrolysis carried out at one atmosphere and with the exclusion of oxygen gas in the carbonization furnace, and through adjusting a proportion of the pyrolysis gas and the air, a temperature of the carbonization furnace is controlled at 200-400° C., a rate of temperature rise of the carbonization furnace is controlled at 5-20° C./min, and a retention time of the biomass raw materials in the furnace is controlled in 20-90 min.

In a class of this embodiment, in the process of milling the charcoal powder for preparing the slurry, an atmospheric mill is adopted, and then water and an additive are added for milling for preparing the charcoal slurry.

In a class of this embodiment, a content of the charcoal powder in the charcoal slurry is 50-70 wt. %, and preferably, 60-65 wt. %.

In a class of this embodiment, the temperature of the carbonization furnace is preferably controlled at 250° C.±10° C., the rate of temperature rise of the carbonization furnace is preferably controlled at 15° C./min, and the retention time of the biomass raw materials in the furnace is preferably controlled in 50 min.

In accordance with another embodiment of the invention, there provided is a gasification system for producing synthetic gas from biomass by pyrolysis comprising: a pre-treatment part for the biomass raw material; a carbonization furnace; a pipeline connector for the carbonization furnace; and a pneumatic conveying system. A top of the carbonization furnace is connected with a cyclone separator; an output end of the cyclone separator is connected with the combustion bed and the charcoal storage bin; an output end of the combustion bed is connected to a heat exchanger for heating recycle pyrolysis gas; and a heated pyrolysis gas outlet is connected with the carbonization furnace, and a heat-exchanged waste heat flue gas outlet is connected with a drying system.

In a class of this embodiment, a water-cooled screw conveyor is arranged on a pipeline from a charcoal outlet of the carbonization furnace to the charcoal storage bin, and the water-cooled screw conveyor is used for cooling the charcoal at the charcoal outlet of the carbonization furnace to 60-280° C. and then conveying the cooled charcoal to the charcoal storage bin.

In a class of this embodiment, a mill, a charcoal slurry tank, and the high-pressure charcoal slurry pump are arranged on a pipeline from an outlet of the charcoal storage bin to the gasification furnace in sequence.

In a class of this embodiment, an input gas supply pipe for the combustion bed is connected with an air pipeline, and the air is used as a combustion-supporting gas.

Advantages of the invention are summarized below:
First, By adopting the low-temperature slow pyrolysis technology, on one hand, the wood fiber structure of the biomass can be destroyed well, the biomass is milled easily, the energy consumption is reduced, and the volume energy density of biomass is increased; on the other hand, at the lower temperature, particularly at the temperature of 250° C.±10° C., the higher solid yield and the higher energy yield can be obtained (The mass yield of charcoal is 60-80%, and the energy yield of charcoal is 70-90%), the energy consumption is reduced, and the carbon conversion rate of the whole system is favorably improved.

Second, the invention adopts the technology of heating the recycle pyrolysis gas as a heat source of the carbonization furnace by using the heat generated by combustion of self-produced pyrolysis gas. The carbonization furnace heating technology of the invention has the following three features: 1) the heat needed by the pyrolysis technique is provided by the inner part of the system so as to realize the thermal equilibrium of the system and not to introduce external energy fundamentally; 2) the heat for heating the recycle pyrolysis gas is provided by direct combustion of the pyrolysis gas and the air. That is to say, the chemical energy of the pyrolysis gas is used, and on the other hand, air, instead of pure oxygen, is used, which greatly reduces the cost of the whole system and increases the use flexibility of the carbonization furnace; 3) the heated recycle pyrolysis gas is directly conveyed to the carbonization furnace to contact the raw material, which not only increases the heating efficiency of the carbonization furnace but also maintains a normal operation for a highest charcoal yield at one atmosphere, with the exclusion of oxygen gas, and by a slow pyrolysis.

Third, the invention uses the waste heat smoke generated by combustion of the pyrolysis gas to dry the raw material, thereby improving the energy efficiency of the whole system.

Fourth, by adopting the technology of preparing slurry by atmospheric milling, the charcoal at the outlet of the carbonization furnace is introduced to the atmospheric mill and then mixed with a certain amount of water and additives to be prepared into a charcoal slurry. The process is simple and efficient. The method of the invention greatly reduces the energy consumption of the inlet raw material and increases the stability, reliability, and feasibility of the system.

Fifth, the invention adopts the technology of charcoal slurry pump pressurizing and transportation. The method avoids the technical problem about pneumatic conveying of powder and tar blockage when feeding dry carbon powder, and also increases the stability, reliability and feasibility of the system.

In short, the invention aims to realize simplicity, efficiency, energy conservation, economy and high project feasibility. Meanwhile, the invention enhances the gasification efficiency, decreases the amount of effective synthesis gas and improves the energy conversion rate of the system.

BRIEF DESCRIPTION OF THE DRAWINGS

The invention is described hereinbelow with reference to accompanying drawings, in which the sole FIGURE is a schematic diagram of a method and a system for producing synthetic gas from biomass by carbonization according to one embodiment of the invention.

DETAILED DESCRIPTION OF THE EMBODIMENTS

For further illustrating the invention, experiments detailing a method and a gasification system for producing synthesis gas from biomass are described below. It should be noted that the following examples are intended to describe and not to limit the invention.

As shown in FIG. 1, a gasification system of this invention comprises: a biomass raw material delivery port 1, a drying system 2, a biomass storage bin 3, a carbonization furnace 4, a cyclone separator 5, an air pipeline 6 for a combustion bed, a combustion bed 7, a compressor 8, a heat exchanger 9 for heating recycle pyrolysis gas, a waste heat flue gas pipeline 10 for the drying system, a water-cooled screw conveyor 11, a charcoal storage bin 12, a mill 13, a water pipeline 14 for slurry preparation for the mill, an additive pipeline 15 for the mill, a charcoal slurry tank 16, a high-pressure charcoal slurry pump 17, an oxygen pipeline 18 for a burner nozzle of a gasification furnace, the burner nozzle 19 of the gasification furnace, the gasification furnace 20, a water cooled wall 21 of the gasification furnace, a synthesis gas pipeline 22, an ash residue pipeline 23, a d desalted and deoxygenated water pipeline 24, a saturated steam pipeline 25, an external fuel pipeline N1, and an emptying pipeline N2.

In the gasification system, a top of the carbonization furnace 4 is connected with the cyclone separator 5, and an output end of the cyclone separator 5 is connected with the combustion bed 7 and the charcoal storage bin 12 respectively. An output end of the combustion bed 7 is connected to the heat exchanger 9 for heating recycle pyrolysis gas. A heated pyrolysis gas outlet is connected with the carbonization furnace 4, and a heat-exchanged waste heat flue gas outlet is connected with the drying system 2.

The water-cooled screw conveyor 11 is arranged on a pipeline from a charcoal outlet of the carbonization furnace 4 to the charcoal storage bin 12, and used for cooling the charcoal at the charcoal outlet of the carbonization furnace to 60-280° C. and then conveying the cooled charcoal to the charcoal storage bin 12.

The mill 13, the charcoal slurry tank 16, and the high-pressure charcoal slurry pump 17 are arranged on a pipeline from an outlet of the charcoal storage bin 12 to the gasification furnace 20 in sequence.

An input gas supply pipe for the combustion bed 7 is connected with the air pipeline 6, and the air is used as combustion-supporting gas.

The method for producing synthesis gas from biomass by carbonization comprises the following steps:
1) pre-treating the biomass raw materials;
2) carrying out low-temperature carbonization to obtain products of pyrolysis gas and charcoal, cooling the charcoal at the outlet of the carbonization furnace to 60-280° C., and then conveying the cooled charcoal to the charcoal storage bin;
3) separating the pyrolysis gas from charcoal powder after allowing the gas removed from the upper part of the carbonization furnace to pass through a gas-solid separator;
4) delivering part of the separated pyrolysis gas to the combustion bed for combustion, heating the other part of pyrolysis gas with the hot flue gas generated during the combustion of the combustion bed through the heat exchanger, and then delivering the heated pyrolysis gas to the carbonization furnace as a heat source for the carbonization furnace; delivering the waste hot flue gas after heat exchange to the pretreatment part for biomass raw materials for drying; conveying the separated charcoal powder to the charcoal storage bin;

5) milling the charcoal powder to prepare slurry; and
6) introducing the charcoal slurry to the gasification furnace for gasification through the high-pressure charcoal slurry pump.

The low-temperature carbonization is slow pyrolysis carried out at one atmosphere and with the exclusion of oxygen gas in the carbonization furnace, and through adjusting the proportion of the pyrolysis gas and air, the temperature of the carbonization furnace is controlled at 200-400° C. the rate of temperature rise of the carbonization furnace is controlled at 5-20° C./min, and the retention time of biomass raw materials in the furnace is controlled in 20-90 min. The temperature of the carbonization furnace is preferably controlled at 250° C.±10° C., the rate of temperature rise of the carbonization furnace is preferably controlled at 15° C./min, and the retention time of biomass raw materials in the furnace is preferably controlled in 50 min.

In the process of milling the charcoal powder for preparing slurry, an atmospheric mill is adopted, and then water and additives are added for milling for preparing charcoal slurry. The content of charcoal powder in the charcoal slurry is 50-70 wt. %, and preferably, 60-65 wt. %.

Working Process:

1. System Start-Up Process:
   1) opening a control valve V1 on a pipeline from the biomass storage bin 3 to the carbonization furnace 4 and a control valve V4 on the emptying pipeline N2, and keeping a control valve V2 on the combustion bed 7 and a control valve V3 on a pipeline from the cyclone separator 5 to the compressor 8 closed;
   2) opening a control valve V6 on the external fuel pipeline N1, a control valve V5 on the air pipeline 6 for the combustion bed as well as a control valve V8 on a pipeline from the combustion bed 7 to the carbonization furnace 4 and a control valve V9 on a pipeline from the combustion bed 7 to the drying system 2, and keeping a control valve V7 on a pipeline from the combustion bed 7 to the heat exchanger 9 for heating recycle pyrolysis gas closed, so as to enable the hot flue gas generated during the combustion of fuels and air in the combustion bed 7 to be introduced in the drying system 2 and the carbonization furnace 4 for providing energy; and
   3) after 30-40 minutes' operation according to the process from step 1) to step 2), opening the control valves V2, V3, and V7, and simultaneously closing the control valves V4, V6, V8, and V9, so that the system starts to work normally at the time.

2. Normal Operation Process of System:

The biomass raw material is fed to the drying system 2 via the biomass raw material delivery port 1. The biomass raw material is dried and dehydrated by the heat smoke in the system and then conveyed to the biomass stock bin 3 for storage, and the biomass raw material is conveyed to the carbonization furnace 4.

The product of the carbonization furnace 4 comprises pyrolysis gas and charcoal containing CO, $H_2$, $CO_2$, $H_2O$, $CH_4$, and tar. The coarse pyrolysis gas is separated by the cyclone separator 5 and then the charcoal particles in the coarse pyrolysis gas are conveyed to charcoal storage bin 12, and pyrolysis gas after the coarse separation are fed to the combustion bed 7 and the compressor 8.

In the combustion bed 7, the pyrolysis gas for combustion undergoes combustion reaction with the air from the pipeline 6. The heat smoke generated by combustion heats the recycle pyrolysis gas; by adjusting the ratio of the pyrolysis gas generated by combustion to air the temperature of the carbonization furnace 4 is controlled at 400-600° C., and the rate of temperature rise of the carbonization furnace 4 is controlled at 5-20° C./min.

After being introduced to the compressor 8 for pressure increase, the recycle pyrolysis gas is heated to a certain temperature through the heat exchange 9 for heating recycle pyrolysis gas, and then the heated recycle pyrolysis gas enters the carbonization furnace 4 for providing energy required for the carbonization furnace; the hot flue gas after heat exchange enters the drying system 2 for drying the biomass raw materials.

The charcoal generated through the carbonization furnace 4 is conveyed to the charcoal storage bin 12 for storage after being cooled through the water-cooled screw conveyor 11. The charcoal enters the mill 13 to be milled with water from the water pipeline 14 for slurry preparation for the mill and an additive from the additive pipeline 15 for the mill to obtain charcoal slurry. The prepared charcoal slurry is introduced to the charcoal slurry tank 16 and then introduced to the burner nozzle 19 of the gasification furnace after the pressure of charcoal slurry is increased to the working pressure of the gasification furnace 20 through the high-pressure charcoal slurry pump 17. The oxygen from the oxygen pipeline 18 is also delivered to the burner nozzle 19 of the gasification furnace to carry out high-temperature gasification reaction in the gasification furnace 20, and the temperature of synthesis gas at the outlet of the gasification furnace is controlled at 1200-1600° C. by adjusting the amount of oxygen and the heat exchange amount of the water-cooled wall 21 (of the gasification furnace) in which desalted and deoxygenated water is introduced. The gasification products are mainly CO and $H_2$, a small amount of $CO_2$ and $H_2O$ and a trace amount of $CH_4$; the desalted and deoxygenated water generates sub-high pressure saturated steam after heat absorption through the water-cooled wall 21 of the gasification furnace, the sub-high pressure saturated steam enters a subsequent system through the saturated steam pipeline 25, and the ash residues generated during gasification are discharged through the ash residue pipeline 23.

Example 1

Take wood as a raw material of biomass. The elemental composition and characteristic data of the dried wood are listed in Table 1.

TABLE 1

Elemental composition and characteristic data of the dried wood

| Items | Symbol | Unit | Value |
| --- | --- | --- | --- |
| Carbon | $C_{ar}$ | % (Kg/Kg) | 39.43 |
| Hydrogen | $H_{ar}$ | % (Kg/Kg) | 5.21 |
| Oxygen | $O_{ar}$ | % (Kg/Kg) | 38.36 |
| Nitrogen | $N_{ar}$ | % (Kg/Kg) | 0.15 |
| Sulfur | $S_{ar}$ | % (Kg/Kg) | 0.21 |
| Chlorine | $Cl_{ar}$ | % (Kg/Kg) | 0.00 |
| Ash | $A_{ar}$ | % (Kg/Kg) | 5.00 |
| Moisture | $M_{ar}$ | % (Kg/Kg) | 11.64 |
| Ash fusion point | FT | ° C. | 1436 |
| Low heat value | LHV | MJ/Kg | 14.75 |

The main operating conditions are set as follows:
1) The water content of materials at the outlet of the drying system 2 is 15 wt. %;
2) The pressure of the carbonization furnace 4 is atmospheric pressure, and the temperature of the carbonization furnace 4 is controlled at 200° C.;

3) The rate of temperature rise of the carbonization furnace 4 is controlled at 20° C./min;
4) The retention time of biomass raw materials in the furnace is controlled in 90 min;
5) The high-temperature charcoal is cooled to 60° C. through the water-cooled screw conveyor 11; and
6) The pressure of the gasification furnace 20 is controlled at 4.0 MPa (A), and the temperature of the gasification furnace 20 is controlled at 1400° C.

According to the set conditions, in the implementation process for illustrating the system with accompanying drawings, the main data and performance parameters of the system are as follows:
1) The mass yield of charcoal in the biomass raw materials introduced into the carbonization furnace 4 is 75%;
2) In the synthesis gas output through the synthesis gas pipeline 22, the content of CO and $H_2$ is 78%;
3) The carbon conversion rate of the gasification system is 99.9%, and the oxygen consumption of available synthesis gas is 0.33 mol/mol.

Example 2

Take wood in Example 1 as a raw material of biomass (Table 1).
The main operating conditions are set as follows:
1) The water content of materials at the outlet of the drying system 2 is 10 wt. %;
2) The pressure of the carbonization furnace 4 is atmospheric pressure, and the temperature of the carbonization furnace 4 is controlled at 300° C.;
3) The rate of temperature rise of the carbonization furnace 4 is controlled at 10° C./min;
4) The retention time of biomass raw materials in the furnace is controlled in 80 min;
5) The high-temperature charcoal is cooled to 60° C. through the water-cooled screw conveyor 11; and
6) The pressure of the gasification furnace 20 is controlled at 4.0 MPa (A), and the temperature of the gasification furnace 20 is controlled at 1400° C.

According to the set conditions, in the implementation process for illustrating the system with accompanying drawings, the main data and performance parameters of the system are as follows:
1) The mass yield of charcoal in the biomass raw materials introduced into the carbonization furnace 4 is 80%;
2) In the synthesis gas output through the synthesis gas pipeline 22, the content of CO and $H_2$ is 82%;
3) The carbon conversion rate of the gasification system is 99.9%, and the oxygen consumption of available synthesis gas is 0.32 mol/mol.

Example 3

Take wood in Example 1 as a raw material of biomass (Table 1).
The main operating conditions are set as follows:
1) The water content of materials at the outlet of the drying system 2 is 20 wt. %;
2) The pressure of the carbonization furnace 4 is atmospheric pressure, and the temperature of the carbonization furnace 4 is controlled at 400° C.;
3) The rate of temperature rise of the carbonization furnace 4 is controlled at 5° C./min;
4) The retention time of biomass raw materials in the furnace is controlled in 30 min;
5) The high-temperature charcoal is cooled to 60° C. through the water-cooled screw conveyor 11; and
6) The pressure of the gasification furnace 20 is controlled at 4.0 MPa (A), and the temperature of the gasification furnace 20 is controlled at 1400° C.

According to the set conditions, in the implementation process for illustrating the system with accompanying drawings, the main data and performance parameters of the system are as follows:
1) The mass yield of charcoal in the biomass raw materials introduced into the carbonization furnace 4 is 70%;
2) In the synthesis gas output through the synthesis gas pipeline 22, the content of CO and $H_2$ is 75%;
3) The carbon conversion rate of the gasification system is 99.9%, and the oxygen consumption of available synthesis gas is 0.34 mol/mol.

Example 4

Take wood in Example 1 as a raw material of biomass (Table 1).
The main operating conditions are set as follows:
1) The water content of materials at the outlet of the drying system 2 is 12 wt. %;
2) The pressure of the carbonization furnace 4 is atmospheric pressure, and the temperature of the carbonization furnace 4 is controlled at 250° C.;
3) The rate of temperature rise of the carbonization furnace 4 is controlled at 15° C./min;
4) The retention time of biomass raw materials in the furnace is controlled in 40 min;
5) The high-temperature charcoal is cooled to 60° C. through the water-cooled screw conveyor 11; and
6) The pressure of the gasification furnace 20 is controlled at 4.0 MPa (A), and the temperature of the gasification furnace 20 is controlled at 1400° C.

According to the set conditions, in the implementation process for illustrating the system with accompanying drawings, the main data and performance parameters of the system are as follows:
1) The mass yield of charcoal in the biomass raw materials introduced into the carbonization furnace 4 is 82%;
2) In the synthesis gas output through the synthesis gas pipeline 22, the content of CO and $H_2$ is 84%;
3) The carbon conversion rate of the gasification system is 99.9%, and the oxygen consumption of available synthesis gas is 0.31 mol/mol.

Example 5

Take wood in Example 1 as a raw material of biomass (Table 1).
The main operating conditions are set as follows:
1) The water content of materials at the outlet of the drying system 2 is 16 wt. %;
2) The pressure of the carbonization furnace 4 is atmospheric pressure, and the temperature of the carbonization furnace 4 is controlled at 220° C.;
3) The rate of temperature rise of the carbonization furnace 4 is controlled at 12° C./min;
4) The retention time of biomass raw materials in the furnace is controlled in 50 min;
5) The high-temperature charcoal is cooled to 60° C. through the water-cooled screw conveyor 11; and
6) The pressure of the gasification furnace 20 is controlled at 4.0 MPa (A), and the temperature of the gasification furnace 20 is controlled at 1400° C.

According to the set conditions, in the implementation process for illustrating the system with accompanying drawings, the main data and performance parameters of the system are as follows:
1) The mass yield of charcoal in the biomass raw materials introduced into the carbonization furnace 4 is 85%;
2) In the synthesis gas output through the synthesis gas pipeline 22, the content of CO and H2 is 86%;
3) The carbon conversion rate of the gasification system is 99.9%, and the oxygen consumption of available synthesis gas is 0.3 mol/mol.

Example 6

Take wood in Example 1 as a raw material of biomass (Table 1).
The main operating conditions are set as follows:
1) The water content of materials at the outlet of the drying system 2 is 18 wt. %;
2) The pressure of the carbonization furnace 4 is atmospheric pressure, and the temperature of the carbonization furnace 4 is controlled at 320° C.;
3) The rate of temperature rise of the carbonization furnace 4 is controlled at 18° C./min;
4) The retention time of biomass raw materials in the furnace is controlled in 70 min;
5) The high-temperature charcoal is cooled to 60° C. through the water-cooled screw conveyor 11; and
6) The pressure of the gasification furnace 20 is controlled at 4.0 MPa (A), and the temperature of the gasification furnace 20 is controlled at 1400° C.

According to the set conditions, in the implementation process for illustrating the system with accompanying drawings, the main data and performance parameters of the system are as follows:
1) The mass yield of charcoal in the biomass raw materials introduced into the carbonization furnace 4 is 78%;
2) In the synthesis gas output through the synthesis gas pipeline 22, the content of CO and $H_2$ is 81%;
3) The carbon conversion rate of the gasification system is 99.9%, and the oxygen consumption of available synthesis gas is 0.32 mol/mol.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A method for producing synthesis gas, the method comprising:
1) feeding a biomass raw material to a drying system and drying the biomass raw material to obtain a dried biomass raw material;
2) delivering the dried biomass raw material into a carbonization furnace, carbonizing the dried biomass raw material at a temperature of between 200 and 400° C. to obtain a coarse pyrolysis gas and charcoal, cooling the charcoal at an outlet of the carbonization furnace to a temperature of 60-280° C., and conveying the charcoal to a charcoal storage bin;
3) passing the coarse pyrolysis gas through a gas-solid separator to obtain a pyrolysis gas and a charcoal powder;
4) delivering part of the pyrolysis gas to a combustion bed; conducting a combustion reaction between the part of the pyrolysis gas and air introduced into the combustion bed to produce a flue gas; heating the remaining part of the pyrolysis gas with the flue gas by utilizing a heat exchanger; delivering the remaining part of the pyrolysis gas to the carbonization furnace in 2) as a heat source for carbonizing the dried biomass raw material; delivering the flue gas to the drying system in 1) for drying the biomass raw material; and conveying the charcoal powder to the charcoal storage bin;
5) milling the charcoal and the charcoal powder to prepare a charcoal slurry; and
6) introducing the charcoal slurry to a gasification furnace for gasification using a high-pressure charcoal slurry pump.

2. The method of claim 1, wherein carbonizing the dried biomass raw material is carried out at one atmosphere and with the exclusion of oxygen gas in the carbonization furnace, and by adjusting a proportion of the pyrolysis gas and the air in the combustion bed, a temperature of the carbonization furnace is controlled at 200-400° C., a rate of temperature rise in the carbonization furnace is controlled at 5-20° C./min, and a retention time of the biomass raw materials in the carbonization furnace is controlled in 20-90 min.

3. The method of claim 1, wherein in the process of milling the charcoal and the charcoal powder for preparing the charcoal slurry, an atmospheric mill is adopted, and water and an additive are added for milling.

4. The method of claim 2, wherein in the process of milling the charcoal and the charcoal powder for preparing the charcoal slurry, an atmospheric mill is adopted, and water and an additive are added for milling.

5. The method of claim 1, wherein a content of the charcoal and the charcoal powder in the charcoal slurry is 50-70 wt. %.

6. The method of claim 2, wherein a content of the charcoal and the charcoal powder in the charcoal slurry is 50-70 wt. %.

7. The method of claim 1, wherein the temperature of the carbonization furnace is controlled at 250° C.±10° C., the rate of temperature rise in the carbonization furnace is controlled at 15° C./min, and the retention time of the biomass raw materials in the carbonization furnace is controlled in 50 min.

8. The method of claim 2, wherein the temperature of the carbonization furnace is controlled at 250° C.±10° C., the rate of temperature rise in the carbonization furnace is controlled at 15° C./min, and the retention time of the biomass raw materials in the carbonization furnace is controlled in 50 min.

9. The method of claim 1, wherein a content of the charcoal and the charcoal powder in the charcoal slurry is 60-65 wt. %.

10. The method of claim 2, wherein a content of the charcoal and the charcoal powder in the charcoal slurry is 60-65 wt. %.

11. The method of claim 2, wherein a rate of temperature rise in the carbonization furnace is controlled at 10-20° C./min.

12. A method for producing synthesis gas, the method comprising:
1) delivering a fuel and air into a combustion bed, and conducting a combustion reaction between the fuel and air to produce a first flue gas;
2) introducing the first flue gas produced in 1) to a drying system and a carbonization furnace;
3) feeding a biomass raw material to the drying system for drying the biomass raw material to obtain a dried biomass raw material;
4) delivering the dried biomass raw material into the carbonization furnace, carbonizing the dried biomass raw material at a temperature of between 200 and 400° C., at one atmosphere, and with the exclusion of oxygen gas, to obtain a coarse pyrolysis gas and charcoal, cooling the charcoal at an outlet of the carbonization furnace to a temperature of between 60 and 280° C., and conveying the charcoal to a charcoal storage bin;

5) passing the coarse pyrolysis gas through a gas-solid separator to obtain a pyrolysis gas and a charcoal powder;

6) conveying the charcoal powder to the charcoal storage bin;

7) dividing the pyrolysis gas into two parts, one part being a pyrolysis gas for combustion, the other part being a recycle pyrolysis gas; delivering the pyrolysis gas for combustion and air into the combustion bed, and conducting a combustion reaction between the pyrolysis gas for combustion and air to produce a second flue gas;

8) introducing the recycle pyrolysis gas and the second flue gas produced in 7) into a heat exchanger for heat exchange, whereby heating the recycle pyrolysis gas by the second flue gas;

9) delivering the recycle pyrolysis gas in 8) to the carbonization furnace in 4) as a heat source for carbonizing the dried biomass raw material and delivering the second flue gas to the drying system in 3) for drying the biomass raw material;

10) conveying the charcoal and the charcoal powder in the charcoal storage bin to a mill, adding water and an additive to be mixed with the charcoal and the charcoal powder, and milling the charcoal and the charcoal powder to prepare a charcoal slurry; and 11) using a high-pressure charcoal slurry pump to introduce the charcoal slurry to a gasification furnace for gasification.

13. The method of claim 12, wherein by adjusting a proportion of the pyrolysis gas for combustion and the air in the combustion bed, a temperature of the carbonization furnace is controlled to be 200-400° C., a rate of temperature rise in the carbonization furnace is controlled to be 5-20° C./min, and a retention time of the biomass raw materials in the carbonization furnace is controlled to be 20-90 min.

14. The method of claim 12, wherein a content of the charcoal and the charcoal powder in the charcoal slurry is 50-70 wt. %.

15. The method of claim 13, wherein a content of the charcoal and the charcoal powder in the charcoal slurry is 50-70 wt. %.

16. The method of claim 12, wherein the temperature of the carbonization furnace is controlled to be 250° C.±10° C., the rate of temperature rise in the carbonization furnace is controlled to be 15° C./min, and the retention time of the biomass raw materials in the carbonization furnace is controlled to be 50 min.

17. The method of claim 13, wherein the temperature of the carbonization furnace is controlled to be 250° C.±10° C., the rate of temperature rise in the carbonization furnace is controlled to be 15° C./min, and the retention time of the biomass raw materials in the carbonization furnace is controlled to be 50 min.

18. The method of claim 12, wherein a content of the charcoal and the charcoal powder in the charcoal slurry is 60-65 wt. %.

19. The method of claim 13, wherein a content of the charcoal and the charcoal powder in the charcoal slurry is 60-65 wt. %.

20. The method of claim 13, wherein a rate of temperature rise in the carbonization furnace is controlled at 10-20° C./min.

* * * * *